US005155500A

United States Patent [19]

Kondo

[11] Patent Number: 5,155,500

[45] Date of Patent: Oct. 13, 1992

[54] MAGNETIC RECORDING DEVICE USING MAGNETIC FLUID DEVELOPING AGENT

[75] Inventor: Nobuhiro Kondo, Tokyo, Japan

[73] Assignee: Seikosha Co., Ltd., Tokyo, Japan

[21] Appl. No.: 596,137

[22] Filed: Oct. 11, 1990

[30] Foreign Application Priority Data

Nov. 15, 1989 [JP] Japan .................................. 1-296489

[51] Int. Cl.[5] ........................................ G11B 9/00

[52] U.S. Cl. .................................. 346/74.2; 355/255; 355/256; 118/627; 118/629; 118/689; 118/660

[58] Field of Search ............... 346/74.2; 355/255, 286; 118/688, 689, 627, 629, 602, 659, 660

[56] References Cited

U.S. PATENT DOCUMENTS

| | | | |
|---|---|---|---|
| 2,857,290 | 10/1958 | Bolton | 346/74.2 |
| 3,646,910 | 3/1972 | Cade et al. | 118/629 X |
| 3,901,188 | 8/1975 | Eberlein | 118/637 |
| 3,959,798 | 5/1976 | Hochberg et al. | 346/74.2 |
| 4,168,329 | 9/1979 | Miyakawa et al. | 118/647 X |
| 4,222,497 | 9/1980 | Lloyd et al. | 118/689 X |
| 4,357,096 | 11/1982 | Fetterman | 118/627 X |
| 4,737,268 | 4/1988 | Giddings | 209/12 |
| 4,827,309 | 5/1989 | Kato | 355/256 |
| 4,994,860 | 2/1991 | Lunde et al. | 355/256 |
| 5,036,365 | 7/1991 | Landa | 355/256 |

*Primary Examiner*—Benjamin R. Fuller
*Assistant Examiner*—Randy W. Gibson
*Attorney, Agent, or Firm*—Jordan and Hamburg

[57] ABSTRACT

A magnetic recording device includes a movable body having a magnetic layer and an arrangement for writing a predetermined magnetic image on the movable body. A developing arrangement is controlled to blow a magnetic fluid onto the movable body in order to develop the magnetic fluid. The magnetic fluid is circulated except at times when the image is being developed by the magnetic fluid.

1 Claim, 2 Drawing Sheets

MAGNETIC RECORDING DEVICE USING MAGNETIC FLUID DEVELOPING AGENT

FIELD OF THE INVENTION

The present invention relates to a magnetic recording device using a magnetic fluid as a developing agent.

BACKGROUND OF THE INVENTION

Magnetic recording converts a magnetic image formed on a magnetic layer into a visible image by using a magnetic material such as a magnetic toner and the like. Since a magnetic image has a high resolution, magnetic recording has promise as a fine pattern forming method.

When a magnetic fluid is used as a magnetic material, however, since the particle size of the magnetic toner is greater than 10 micrometers, the formation of a fine pattern suited to the magnetic image can not be effected.

In order to solve this problem, it has been proposed to provide a magnetic recording device using a magnetic fluid as a magnetic material. (For example, cf. the official publication of the Japanese Patent Application Laid-Open No. 48063/1985). The magnetic recording device disclosed in the official publication of the Japanese Patent Application Laid-Open No. 48063/1985 immerses the surface of a magnetic drum formed with a magnetic image in a magnetic fluid, and the magnetic image is gradually made into a visual image, while rotating the movable body.

In the above-described conventional magnetic device, since development is carried out by immersing the surface of the magnetic drum in a magnetic fluid, a problem arises due to the fact that the liquid surface of the magnetic fluid moves up and down due to the evaporation and the like of the solvent of the magnetic fluid. As a result, development could not be carried out under constant conditions, and development of unevenness was apt to be generated.

SUMMARY OF THE INVENTION

An object of the present invention is to correct such development unevenness and to improve the recording quality of the magnetic recording device.

Briefly stated, in accordance with the invention, a developing arrangement is provided for blowing a magnetic fluid on a movable magnetized layer having a magnetic image thereon.

In the following, an explanation will be given of an embodiment of the present invention with reference to the appended drawings.

DESCRIPTION OF THE PREFERRED EMBODIMENTS

Figure 1:
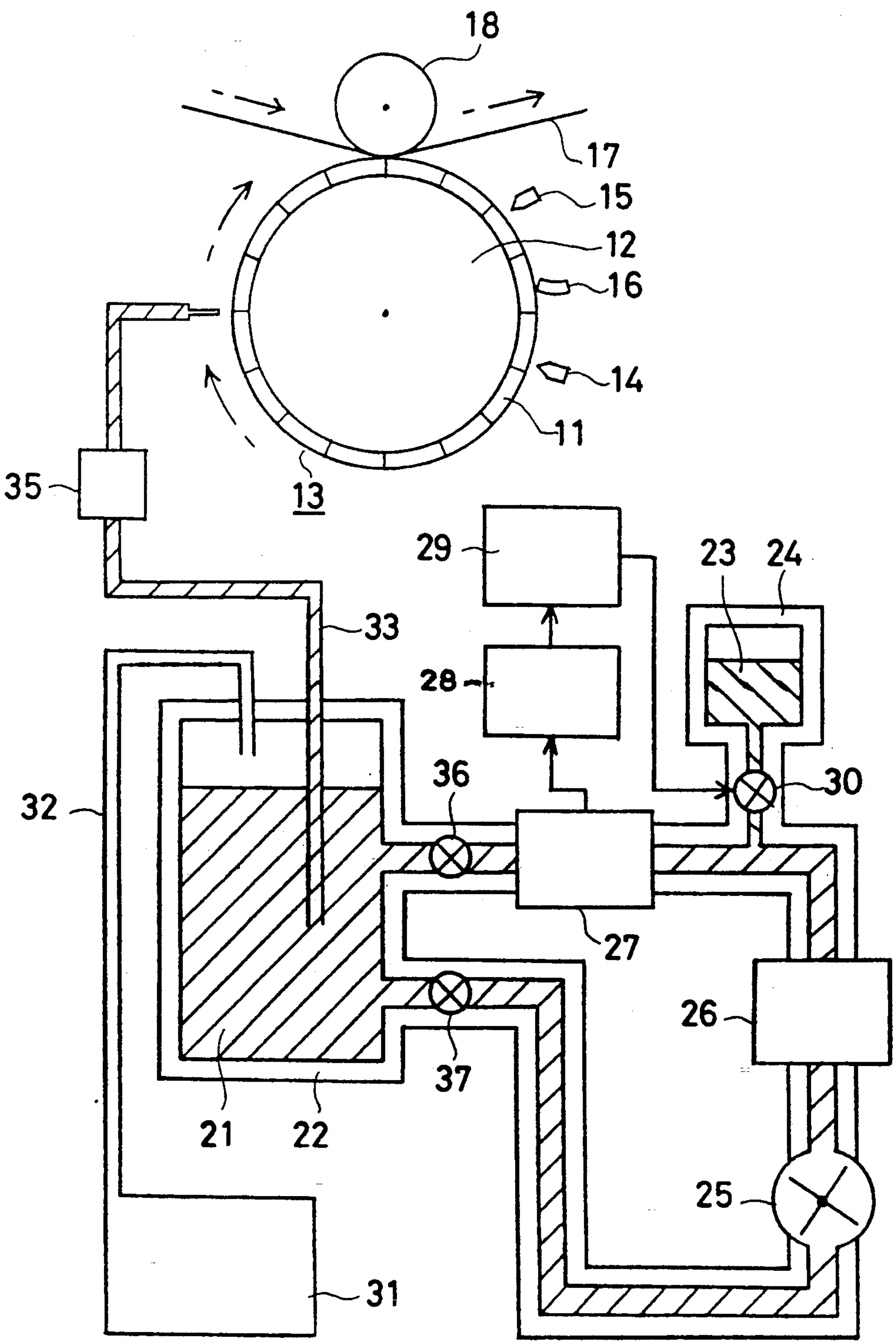
FIG. 1 is an explanatory diagram showing an embodiment of the present invention.

An explanation will first be given of respective elements of the arrangement shown in FIG. 1.

Numeral 11 denotes a magnetic layer, which has been formed by dispersing the powder of $Fe_2O_3$, $CrO_2$, Fe (iron), Ni (nickel), Co (cobalt), etc. in a resin. Although it is not shown in the figure, a protective layer may be formed on the surface of this magnetic layer 11.

Numeral 12 denotes a circular pillow or cylindrical substrate having the magnetic body on its surface 11. This element rotates in the direction of the arrows adjacent the element.

The above-described magnetic layer 11 and the substrate 12 define a magnetic drum 13 (movable body).

Numeral 14 denotes a write-in head, which is a magnetic image forming means, and writes a magnetic pattern on the magnetic layer 11 to form a magnetic image thereon.

Numeral 15 denotes a magnetic erasing head which erases the magnetic image.

Numeral 16 denotes a cleaning blade which removes the magnetic fluid (described later), etc., adhered on the surface of the magnetic drum 13 and cleans the surface of the magnetic drum 13.

Numeral 17 denotes a recording medium which may be transcription paper or the like.

Numeral 18 denotes a transcription roller, which transcribes successively the patterns developed by the magnetic fluid, and formed, in correspondence with the magnetic image on the magnetic layer 11, on the recording medium 17.

Numeral 21 denotes a magnetic fluid which is formed by suspending a ferromagnetic powder of about 10 nanometer particle size in water or an organic solvent.

Numeral 22 denotes a storing vessel which stores the magnetic fluid 21.

Numeral 23 denotes a solvent of the magnetic fluid.

Numeral 24 denotes a storing vessel for storing the solvent 23.

Numeral 25 denotes a circulating means for circulating the magnetic fluid 21. This circulating means 25 is formed, for example, by a rotating device.

Numeral 26 denotes a filter for filtering unnecessary material contained in the magnetic fluid while the fluid is circulating.

Numeral 27 denotes a flow amount detecting device for detecting the flow amount of the circulating magnetic fluid 21. This flow amount detecting device 27 can be, for example, a differential type of flow detector.

Numeral 28 denotes a detecting circuit for detecting the viscosity of the magnetic fluid 21 on the basis of the flow amount per unit time detected by the flow amount detecting device 27.

Numeral 29 denotes a control circuit for controlling the open and close states of the control valve described later, on the basis of the information from the detecting circuit 28.

Numeral 30 denotes a control valve which opens and closes in response to signals from the control circuit 29.

Numeral 31 denotes an air pump for sending air through the tube 32 to the storing vessel 22.

Figure 2:
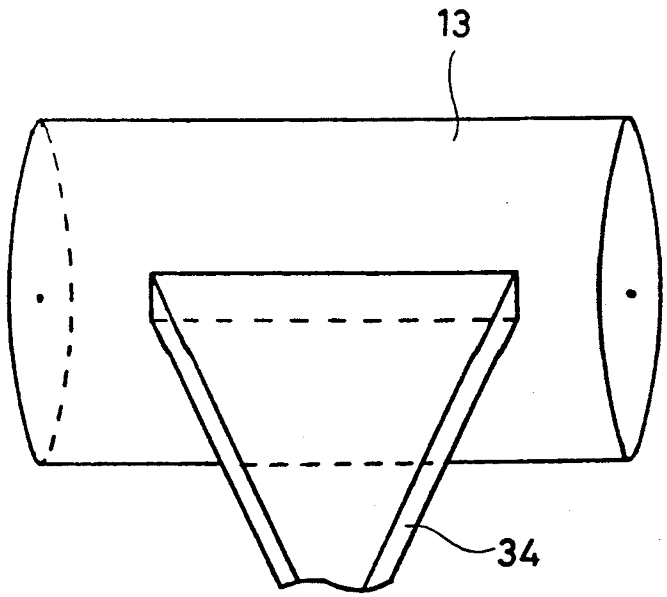
FIG. 2 illustrates the tip of the nozzle.

Numeral 34 denotes a nozzle for defining a developing means and for blowing the magnetic fluid 21 sent through the tube 33 onto the magnetic drum 13. As shown in FIG. 2, the tip of the nozzle 34 is formed to be broadened in the axial direction of the magnetic drum 13 to correspond to the width of the recording medium.

Numeral 35 denotes a pressure adjusting valve.

Numerals 36 and 37 denote valves which are usually in the open state and are closed when air is sent from the air pump 31 through the tube 32 into the storing vessel 22.

An explanation will now be given on the operation of the invention.

First, an explanation will be given of a series of operations such as the formation, transcription, etc. of the magnetic image.

A predetermined magnetic pattern is successively written on the magnetic body by the write-in head 14, and a magnetic image is formed thereon. This magnetic image is developed as follows. From the air pump 31, air is sent into the storing vessel 22 through the tube 32. At this time, each of the valves 36 and 37 is closed. Therefore, the magnetic fluid 21 is blown onto the magnetic drum 13 from the tip of the nozzle 34 by the air pressure from the air pump 31. As a result, the magnetic fluid adheres on the surface of the magnetic drum 13 formed with the magnetic image by the magnetic force, and development is effected on the part of the drum where the magnetic image is not formed, since the magnetic force does not act between it and the magnetic fluid, the magnetic fluid does not adhere thereon. The developed pattern of the magnetic fluid adhered on the surface of the magnetic drum 13 is transcribed on the recording medium 17 by the transcription roller 8. When the transcription action is done, the magnetic image is erased by the magnetic erasing head 15. After finishing the magnetic erasing action, the magnetic fluid and the like adhered on the surface of the magnetic drum 13 are removed, and the surface of the magnetic drum 13 is cleaned.

An explanation will now be given of the operation for circulating the magnetic fluid 21 and the operation for keeping the viscosity of the magnetic fluid 21 constant.

The magnetic fluid is always circulating, except at the time of development, by the circulating device 25. Unnecessary material contained in the magnetic fluid is filtered by the filter 26 during circulation. As a result, the magnetic fluid is always kept clean. The flow amount of the magnetic fluid 21 during circulation is detected by the flow amount detecting device 27. In the detecting circuit 28, the viscosity of the magnetic fluid 21 is detected on the basis of the flow amount per unit time as detected by the flow amount detecting device 27. In the control circuit 29, the open and closed state of the control valve 30 is controlled on the basis of the information from the detecting circuit 28. For example, when the solvent of the magnetic fluid 21 has evaporated and the viscosity of the magnetic fluid 21 increases, the control valve 30 opens in response to signals from the control circuit 29. As a result, the solvent 23 in the storing vessel 234 flows out through the control valve 30 to maintain the viscosity of the magnetic fluid 21 constant.

In the magnetic recording device of the present invention, since development is carried out by blowing the magnetic fluid on the surface of the magnetic drum, the conventionally uneven development is reduced, and an improvement in the recording quality can be attained.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

What is claimed is:

1. A magnetic recording device comprising a movable body having a magnetic layer thereon, said body having a surface, means for forming a magnetic image on said magnetic layer, a storing vessel containing a magnetic fluid, developing means for blowing said magnetic fluid from said storing vessel onto the surface of the movable body for developing said magnetic image, said magnetic fluid having a viscosity, and means for maintaining the viscosity of said magnetic fluid in said storing vessel constant;

said means for maintaining said viscosity constant comprising circulating path for circulating said magnetic fluid in said vessel, and means for adding a solvent to said magnetic fluid in said circulating path, said fluid having a flow rate in said path;

and further comprising means for detecting the flow rate of fluid in said path, means for determining the viscosity of said magnetic fluid from said detected flow rate, and means responsive to said determined viscosity for controlling said means for adding a solvent to said magnetic fluid; and further comprising means for circulating said magnetic fluid in said path only when said developing means is not blowing said magnetic fluid on said surface of said movable body.

* * * * *